United States Patent
Hafner et al.

(10) Patent No.: US 12,172,636 B2
(45) Date of Patent: Dec. 24, 2024

(54) VEHICLE PATH ADJUSTMENT USING A VIRTUAL BOUNDARY THAT IS BASED ON A SHAPE OF A VEHICLE BODY

(71) Applicant: Ford Global Technologies, LLC, Dearborn, MI (US)

(72) Inventors: Michael Hafner, San Carlos, CA (US); Mohit Srinivasan, Ann Arbor, MI (US); Abhishek Sharma, West Bloomfield, MI (US); Mrdjan J. Jankovic, Birmingham, MI (US); Dogan Sumer, Ann Arbor, MI (US); Alexander Jaeckel, Ann Arbor, MI (US); Aakar Mehra, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 17/527,207

(22) Filed: Nov. 16, 2021

(65) Prior Publication Data

US 2023/0150485 A1 May 18, 2023

(51) Int. Cl.
*B60W 10/18* (2012.01)
*B60W 10/20* (2006.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/143; B60W 30/16; B60W 40/04;
(Continued)

(56) References Cited

U.S. PATENT DOCUMENTS 9,568,915 B1 2/2017 Berntorp et al.
9,964,952 B1 5/2018 Costa et al.
(Continued)

FOREIGN PATENT DOCUMENTS

CN 110196599 B 8/2020
CN 111791898 B * 8/2020 ............ B60W 30/09
(Continued)

OTHER PUBLICATIONS

KR 100578942 B1—Machine Translation—Bang et al.—Oct. 2004 (Year: 2004).*
(Continued)

*Primary Examiner* — Jess Whittington
*Assistant Examiner* — Rami Nabih Bedewi
(74) *Attorney, Agent, or Firm* — Frank A. MacKenzie; Bejin Bieneman PLC

(57) ABSTRACT

A system for detecting a road surface includes a processor and a memory. The memory stores instructions executable by the processor to determine a virtual boundary for a vehicle body based on a shape of the vehicle body, to identify one or more objects based on vehicle sensor data, based on the identified one or more objects, the determined virtual boundary, and an input to at least one of propulsion, steering, or braking, to determine at least one of a braking override or a steering override, and based on the determination, to perform at least one of adjusting a vehicle steering and a vehicle speed.

16 Claims, 4 Drawing Sheets

(51) Int. Cl.
| | |
|---|---|
| *B60W 30/09* | (2012.01) |
| *B60W 30/14* | (2006.01) |
| *B60W 30/16* | (2020.01) |
| *B60W 40/04* | (2006.01) |
| *B60W 40/06* | (2012.01) |
| *B60W 50/00* | (2006.01) |
| *G06F 18/00* | (2023.01) |
| *G06V 20/56* | (2022.01) |
| *G06V 20/58* | (2022.01) |

(52) U.S. Cl.
CPC .......... *B60W 30/143* (2013.01); *B60W 30/16* (2013.01); *B60W 40/04* (2013.01); *B60W 40/06* (2013.01); *B60W 50/00* (2013.01); *G06F 18/00* (2023.01); *G06V 20/58* (2022.01); *G06V 20/588* (2022.01); *B60W 2050/0083* (2013.01); *B60W 2554/80* (2020.02); *G06F 2218/08* (2023.01)

(58) Field of Classification Search
CPC .. B60W 40/06; B60W 50/00; B60W 2554/80; B60W 2050/0083; G06V 20/58; G06V 20/588; G06F 18/00; G06F 2218/08
See application file for complete search history.

(56) References Cited

U.S. PATENT DOCUMENTS

| | | | |
|---|---|---|---|
| 9,983,306 | B2 | 5/2018 | Zeng et al. |
| 10,671,076 | B1 | 6/2020 | Kobilarov et al. |
| 2012/0025964 | A1 | 2/2012 | Beggs et al. |
| 2015/0293216 | A1 | 10/2015 | O'Dea et al. |
| 2017/0315549 | A1 | 11/2017 | Oppolzer |
| 2017/0345308 | A1 | 11/2017 | Buburuzan et al. |
| 2017/0372618 | A1 | 12/2017 | Xu et al. |
| 2018/0056998 | A1 | 3/2018 | Benosman et al. |
| 2018/0074505 | A1 | 3/2018 | Lv et al. |
| 2018/0150081 | A1 | 5/2018 | Gross et al. |
| 2018/0364787 | A1 | 12/2018 | Fukumoto |
| 2019/0025851 | A1 | 1/2019 | Ebrahimi Afrouzi |
| 2019/0049968 | A1 | 2/2019 | Dean et al. |
| 2020/0117200 | A1 | 4/2020 | Akella et al. |
| 2020/0117206 | A1 | 4/2020 | Egnor et al. |
| 2020/0225670 | A1* | 7/2020 | Jankovic .............. G05D 1/0223 |
| 2021/0053563 | A1* | 2/2021 | Li ..................... B60W 30/0953 |
| 2021/0331676 | A1 | 10/2021 | Wu et al. |
| 2022/0204029 | A1 | 6/2022 | Chen et al. |
| 2022/0379478 | A1 | 12/2022 | Raghunathan et al. |
| 2023/0041031 | A1 | 2/2023 | Baldan |

FOREIGN PATENT DOCUMENTS

| | | | | |
|---|---|---|---|---|
| KR | 100578942 | B1 * | 10/2004 | ............. B64C 13/18 |
| WO | 2017197170 | A1 | 11/2017 | |

OTHER PUBLICATIONS

CN 111791898 B—Machine Translation, Jin et al.—Aug. 2020 (Year: 2020).*
KR100578942B1—Machine Translation—Bang et al. (Year: 2004).*
Xiangru Xu, "Constrained Control of Input-Output Linearizable Systems Using Control Sharing Barrier Functions", Department of Electrical Engineering and Computer Science, University of Michigan, Ann Arbor, MI (2017) (7 pages).
Trautman, et al., "Unfreezing the Robot: Navigation in Dense, Interacting Crowds", IEEE/RSJ International Conference on Intelligent Robots and Systems (2010) (7 pages).
Snape, et al., "The Hybrid Reciprocal Velocity Obstacle", IEEE Transactions on Robotics, vol. 27, No. 4 (Aug. 2011) (pp. 696-706.
Kim, et al., "Game Theory Based Autonomous Vehicles Operation", International Journal of Vehicle Design (IJVD), vol. 65, No. 4 (2014) (24 pages).
Hassan, et al., "A Fully-Distributed Heuristic Algorithm for Control of Autonomous Vehicle Movements at Isolated Intersections", International Journal of Transportation Science and Technology, vol. 3, No. 4 (2014), pp. 297-310 (13 pages).
Borrmann, et. al., "Control Barrier Certificates for Safe Swarm Behavior", IFAC PapersOnLine 48-27 (2015), pp. 68-73 (6 pages).
Non-Final Office Action re U.S. Appl. No. 17/750,434 dated Oct. 1, 2024.

* cited by examiner

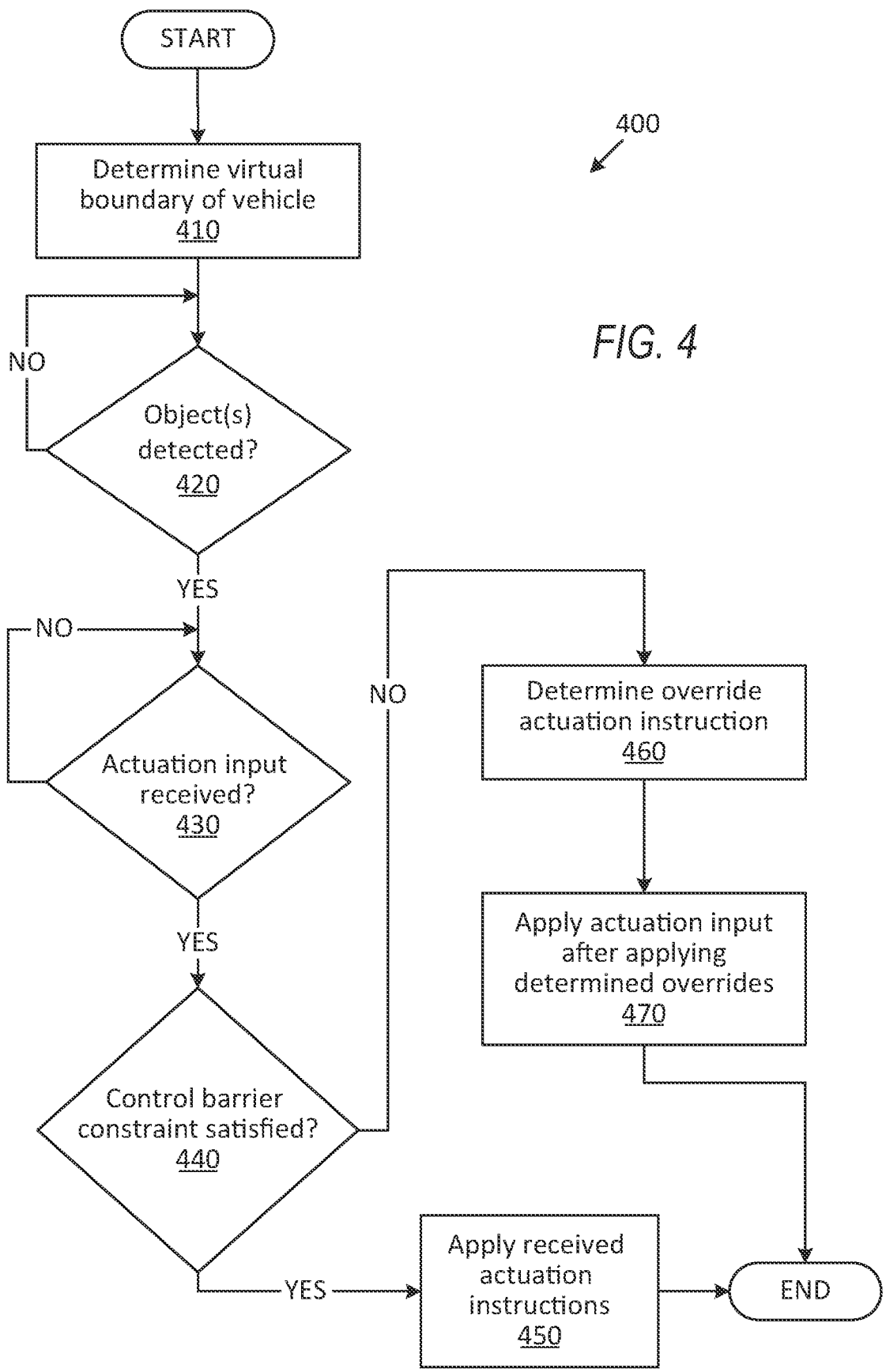

VEHICLE PATH ADJUSTMENT USING A VIRTUAL BOUNDARY THAT IS BASED ON A SHAPE OF A VEHICLE BODY

BACKGROUND

Computers can provide commands to operate vehicles autonomously or semi-autonomously. Other vehicles, both moving and non-moving, as well as other moving and/or non-moving objects, e.g., a bicycle, a pedestrian, etc., may be present in an area where a first or host vehicle operates. Planning a path for the host vehicle, especially when taking into account possible paths of other moving objects, can be challenging.

BRIEF DESCRIPTION OF THE DRAWINGS

FIG. 4 is a flowchart of an exemplary process for navigating a vehicle.

DETAILED DESCRIPTION

Introduction

Figure 1:
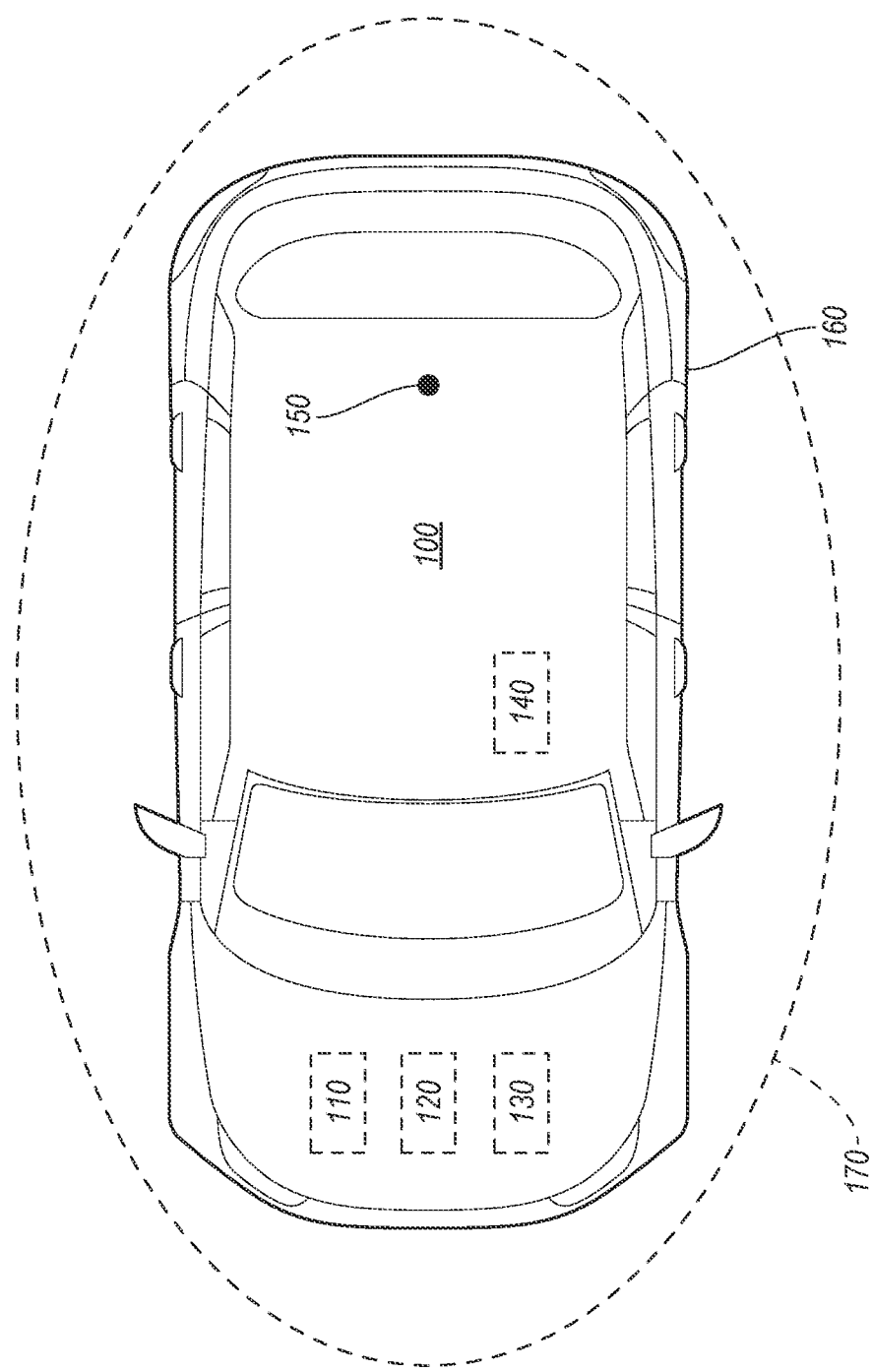
FIG. 1 is a diagram showing an example vehicle with a virtual boundary.

Disclosed herein is a system for detecting a road surface, comprising a processor and a memory. The memory stores instructions executable by the processor to determine a virtual boundary for a vehicle body based on a shape of the vehicle body, to identify one or more objects based on vehicle sensor data, based on the identified one or more objects, the determined virtual boundary, and an input to at least one of propulsion, steering, or braking, to determine at least one of a braking override or a steering override, and based on the determination, to perform at least one of adjusting a vehicle steering and a vehicle speed.

The instructions to determine the virtual boundary may further include instructions to specify the virtual boundary by specifying a function that determines lengths of virtual lines from a reference point inside the virtual boundary and a point on the virtual boundary at respective orientations of the virtual line relative to a reference line.

The instructions to determine the at least one of the braking override or the steering override may include instructions to perform optimization operation on a control barrier function including a distance function and a derivative of the distance function, wherein the distance function is defined, at an orientation of a line extending from a reference point of the virtual boundary to the one or more objects, based on a length of the line from the one or more objects to an intersection with the virtual boundary.

The instructions may further include instructions to determine the derivative of the distance function based on a derivative of distance of a virtual line extending from the virtual boundary to the one or more objects and a derivative of the orientation of the virtual line relative to a virtual reference line.

The instructions may further include instructions to determine the braking override further based on a maximum allowed deceleration.

The instructions may further include instructions to determine the steering override further based on a maximum allowed steering.

The input to at least one of propulsion, steering, or braking may be received from at least one of a vehicle operator or an autonomous vehicle control system.

Further disclosed herein is a method for detecting a road surface including determining a virtual boundary for a vehicle body based on a shape of the vehicle body, identifying one or more objects based on vehicle sensor data, based on the identified one or more objects, the determined virtual boundary, and an input to at least one of propulsion, steering, or braking, determining at least one of a braking override or a steering override, and based on the determination, performing at least one of adjusting a vehicle steering and a vehicle speed.

Determining the virtual boundary may further include specifying the virtual boundary by specifying a function that determines lengths of virtual lines from a reference point inside the virtual boundary and a point on the virtual boundary at respective orientations of the virtual line relative to a reference line.

Determining the at least one of the braking override or the steering override may further include performing optimization operation on a control barrier function including a distance function and a derivative of the distance function, wherein the distance function is defined, at an orientation of a line extending from a reference point of the virtual boundary to the one or more objects, based on a length of the line from the one or more objects to an intersection with the virtual boundary.

The method may further include determining the derivative of the distance function based on a derivative of distance of a virtual line extending from the virtual boundary to the one or more objects and a derivative of the orientation of the virtual line relative to a virtual reference line.

The method may further include determining the braking override further based on a maximum allowed deceleration.

The method may further include determining the steering override further based on a maximum allowed steering.

The method may further include receiving the input to at least one of propulsion, steering, or braking from at least one of a vehicle operator or an autonomous vehicle control system.

Further disclosed is a computing device programmed to execute any of the above method steps.

Yet further disclosed is a computer program product, comprising a computer-readable medium storing instructions executable by a computer processor, to execute any of the above method steps.

Exemplary System Elements

A vehicle may traverse a path by actuating vehicle propulsion, braking, and/or steering. The vehicle may be operated by a human operator and/or a computer based on a variety of data, e.g., data about a presence and/or movement of other objects such as vehicles, bicycles, pedestrians, etc. To address technical challenges arising in planning and/or executing a path for a vehicle, a vehicle computing device can include programming to determine a virtual boundary for a vehicle body based on a shape of the vehicle body, identify one or more objects based on vehicle sensor data, and then, based on the detected one or more objects, the determined virtual boundary, and an input to at least one of propulsion, steering, or braking, to determine at least one of a braking override, acceleration override, or a steering override, and further, based on the determination, can perform at least one of adjusting a vehicle steering and a vehicle speed.

FIG. 1 illustrates an example vehicle 100. The vehicle 100 may be powered in a variety of ways, e.g., with an electric motor and/or internal combustion engine. The vehicle 100 may be a land vehicle such as a car, truck, etc. A vehicle 100 may include a computer 110, actuator(s) 120, sensor(s) 130, and a human-machine interface (HMI 140). A reference point 150 can be defined with respect to the vehicle 100, e.g., the illustrated reference point 150 is within the space defined by a vehicle 100 body 160, and is a geometrical center point, i.e., a point at which respective longitudinal and lateral center axes of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and/or steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations. As discussed below, the computer can include programming to override a human operator or an autonomous vehicle control system, e.g., by actuating a brake, propulsion, and/or steering actuator. For example, the computer 110 may be programmed to execute instructions of an autonomous vehicle control system to operate the vehicle and additionally be programmed based on the techniques disclosed herein to override an operation of the autonomous vehicle control system programmed based on specified conditions, as discussed below. In another example, a first computer 110 may be programmed to operate the vehicle autonomously and a second computer 110 may be programmed to override actuation of the first computer 110 when specific conditions are satisfied. In yet another example, a first computer 110 may operate the vehicle based on inputs received from a human operator and a second computer 110 may be programmed based on the techniques herein to override human user actuation commands when specific conditions are satisfied.

The computer 110 may include or be communicatively coupled to (e.g., via a vehicle 100 communications bus as described further below) more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a wireless vehicular communication interface with other traffic objects (e.g., vehicles, infrastructure, pedestrian, etc.), e.g., via a vehicle-to-vehicle communication network and/or a vehicle-to-infrastructure communication network. The vehicular communication network represents one or more mechanisms by which the computers 110 of vehicles 100 may communicate with other traffic objects, and may be one or more of wireless communication mechanisms, including any desired combination of wireless (e.g., cellular, wireless, satellite, microwave and radiofrequency) communication mechanisms and any desired network topology (or topologies when multiple communication mechanisms are utilized). Exemplary vehicular communication networks include cellular, Bluetooth®, IEEE 802.11, dedicated short-range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100. The computer 110 may be programmed to actuate the vehicle 100 actuators 120 including propulsion, steering, and/or braking actuators 120 based on the planned acceleration.

The sensors 130 may include a variety of devices known to provide data to the computer 110. For example, the sensors 130 may include object detection sensors 130 such as Light Detection And Ranging (LIDAR) sensor(s) 130 disposed on a top of the vehicle 100 that provide relative locations, sizes, and shapes of one or more targets 200 (or objects) surrounding the vehicle 100, e.g., second vehicles, bicycles, pedestrians, robots, drones, etc., traveling next to, ahead, or behind of the vehicle 100. As another example, one or more radar sensors 130 fixed to vehicle 100 bumpers may provide locations of the target(s) 200 relative to the location of the vehicle 100.

The object detection sensors 130 may include camera sensor(s) 130, e.g. to provide a front view, side view, etc., providing images from an area surrounding the vehicle 100. For example, the computer 110 may be programmed to receive image data from a camera sensor(s) 130 and to implement image processing techniques to detect a road, infrastructure elements, etc. The computer 110 may be further programmed to determine a current vehicle 100 location based on location coordinates, e.g., GPS coordinates, received from a vehicle 100 location (e.g., GPS) sensor 130.

The HMI 140 may be configured to receive input from a user during operation of the vehicle 100. Moreover, an HMI 140 may be configured to provide output to the user. The HMI 140 is typically located in the passenger compartment of the vehicle 100. In one example, the computer 110 may be programmed to receive destination a destination location, from the HMI 140. The destination location can be specified according to geocoordinates or the like, e.g., according to map data stored in the vehicle 100.

Figure 2:
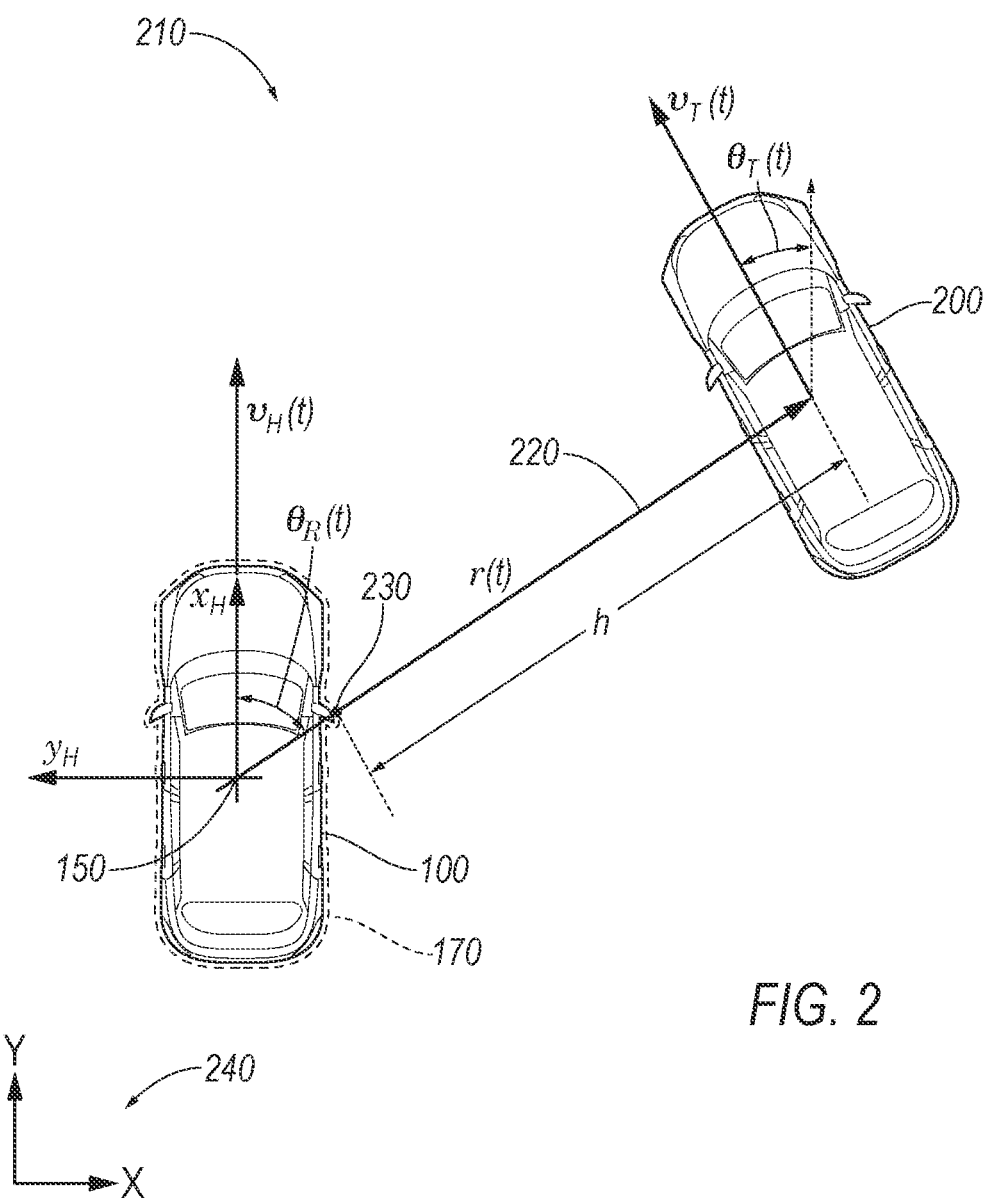
FIG. 2 is a diagram showing the vehicle of FIG. 1 and a target object.

FIG. 2 shows an example operating scenario of the vehicle 100 and a target object, or target 200, e.g., a second vehicle, a pedestrian, etc., within an area 210. An area 210, in the present context, means a portion of a ground surface, e.g., a two-dimensional (2D) area on the surface of the earth. Location coordinates of vehicle(s) 100, target(s) 200, etc., may be defined by global positioning system (GPS) coordinates. Boundaries or edges of an area 210, e.g., defined by connecting vertices of a triangular or rectangular area, specifying a radius from a center of a circular area, etc., may be specified by GPS coordinates. An area 210 may have any suitable dimensions and/or shape, e.g., rectangular, oval, circular, irregularly shaped, etc. An area 210 may include a section of a road, an intersection, etc. An area 210 may be defined by a detection range of a sensor 130, i.e., locations within a predetermined distance, e.g., 200 meters (m), from the sensor 130.

In addition to a vehicle 100, target(s) 200 such as other vehicles, pedestrians, bicycles, etc. may be present in the area. The locations of the vehicle 100 and the target(s) 200 may be specified in a two-dimensional Cartesian coordinate system 240, e.g., having X, Y axes, as shown in FIG. 2. For example, the location coordinates of the vehicle 100 and/or the targets 200 may be defined according to one or more of GPS location coordinates, a coordinate system defined with respect to the vehicle 100, e.g., the reference point 150, a coordinate system defined for a locale or area in which the vehicle 100 is operating, etc.

The computer 110 may navigate the vehicle 100, e.g., based on data received from the HMI 140. For example, the received data may include GPS location coordinates of a destination specified according to user input.

A vehicle 100 can operate on a roadway by determining a path polynomial to traverse a vehicle path. A computer 110 can determine a path polynomial including path coefficients based on vehicle 100 sensor data and/or data received from a remote computer, etc. In the present context, a path is a straight and/or curved line that describes successive locations (i.e., locations at different times) of an object, e.g., a vehicle 100, a target 200, etc., on a two-dimensional (2D) plane parallel to the surface of a roadway upon which the object moves.

The computer 110 may be programmed to actuate vehicle 100 actuators 120, e.g., propulsion, braking, and/or steering actuators 120. In one example, the computer 110 may actuate the vehicle 100 actuators 120 based on input received from a vehicle 100 operator via a vehicle HMI 140, e.g., brake pedal, steering wheel, gas pedal, etc. Additionally or alternatively, the computer 110 may be programmed to operate the vehicle 100 in an autonomous mode by actuating vehicle 100 actuators 120 to navigate the vehicle 100 to a destination while avoiding a collision with other target(s) 200 within the area 210. The vehicle 100 computer 110 can be programmed to determine an acceleration command $u_p$ and a steering command $\delta p$ for the vehicle 100 based on the vehicle 100 destination and sensor 130 data. The computer 110 may be programmed to actuate propulsion and/or braking actuator(S) 120 based on the determined acceleration command $u_p$ and actuate a steering actuator 120 based on the determined steering command $\delta p$.

As disclosed herein, a vehicle computer 110 can detect a road surface, i.e., characteristics or attributes of a ground surface on which a vehicle 100 is operating, and can then, based on the detected road surface, intervene in vehicle 100 operation of propulsion, steering, and/or braking. For example, the vehicle computer 110 could override a vehicle 100 operator input and/or a command generating by a virtual driver program or the like, i.e., a command generated in a vehicle computer 110 to control the vehicle 100 based at least in part on data from one or more vehicle sensors 130. For example, a vehicle 100 computer 110 can be programmed to determine a virtual boundary 170 for a vehicle 100 body 160 based on a shape of the vehicle 100 body 160, to identify target(s) 200 based on vehicle sensor data, based on the detected target(s) 200, the determined virtual boundary 170, and an input to at least one of propulsion, steering, or braking, determine at least one of a braking override, acceleration override, or a steering override, and based on the determination, perform at least one of adjusting a vehicle 100 steering and a vehicle 100 speed.

In the present context, a steering override $\bar{\delta}$, and an acceleration override $\bar{u}$ are respective commands to deviate from a steering command $\delta p$ or acceleration command $u_p$ determined based on user input and/or by a vehicle computer 110. Acceleration override $\bar{u}$ may be an array including propulsion override and braking override.

Figure 3:
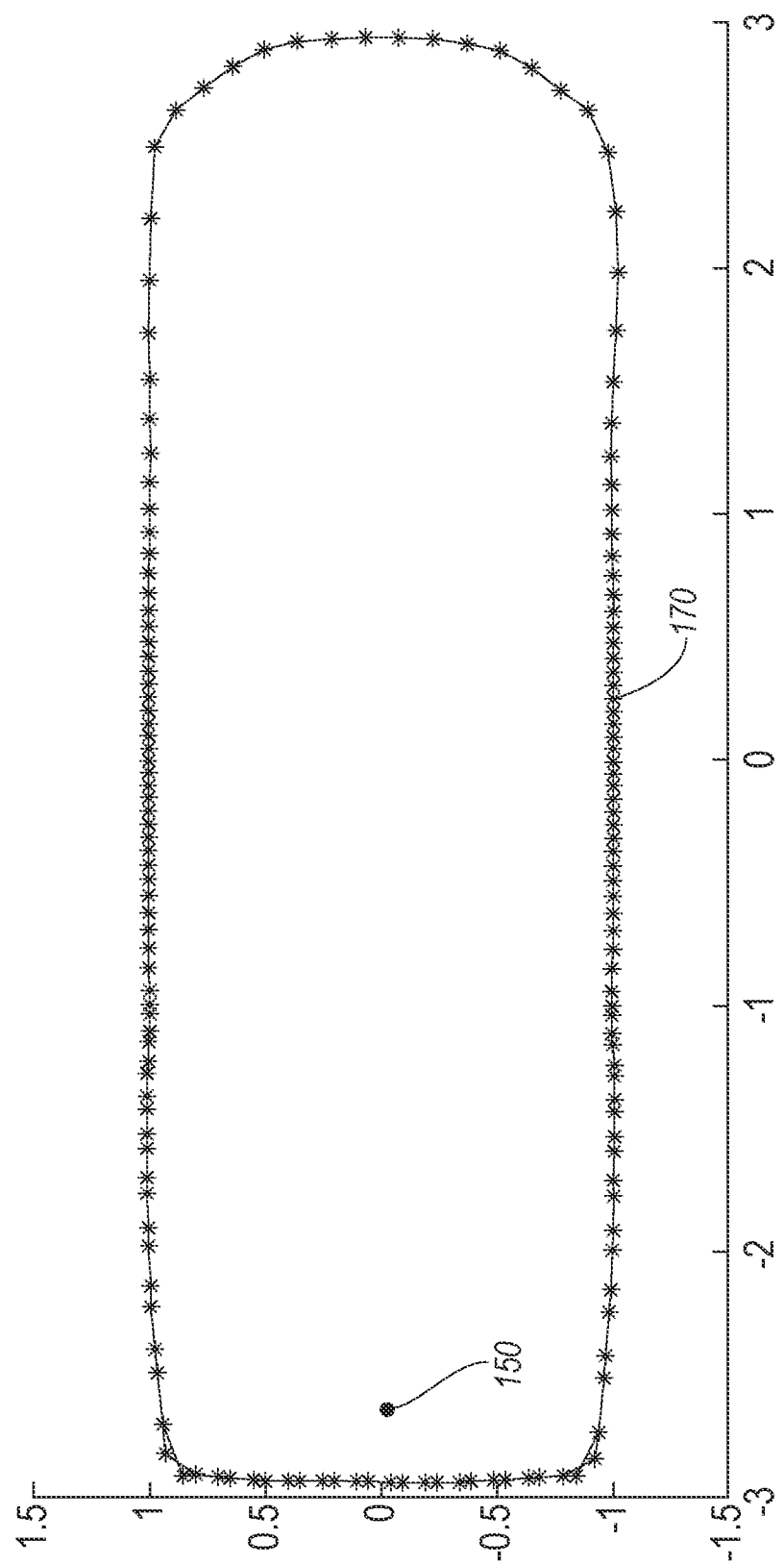
FIG. 3 is a diagram showing another example of a virtual boundary of the vehicle of FIG. 1.

FIG. 3 shows another example of a virtual boundary 170 for the vehicle 100 defined as an area on a ground surface around the vehicle 100, e.g., defined based on an exterior shape of the vehicle 100 in a horizontal plane. Typically the virtual boundary 170 is defined as a projection of the vehicle 100 body 160 on the ground surface including accessories such as exterior mirrors, bumpers, etc., which may be at different heights (i.e., distances from a ground surface). That is, a top-down view of an outline of a vehicle 100 body 160 could be projected onto a ground surface to define a 2D virtual boundary 170. Thus, a virtual boundary 170 defines an area around the vehicle 100 enclosing the body 160 of the vehicle 100. An area of a virtual boundary 170 can be mathematically specified as $\{(r, \theta_R) \in [0, \infty) \times [0, 2\pi) | r \leq \Gamma(\theta_R)\}$. In one example, each point on the virtual boundary 170 is defined to be spaced from a nearest point of the vehicle 100 body 160 by a specified distance, e.g., 10 centimeters (cm). With reference to Equation (1) and FIG. 2 below, the computer 110 may be programmed to specify the virtual boundary 170 by implementing a function $\Gamma(\theta_R)$ that determines a distance from the reference point 150 within the virtual boundary to a point 230 on the virtual boundary at an angle $\theta_R$ angle between a virtual line 220 and reference line $x_h$. In other words, the function $\Gamma(\theta_R)$ can specify various shapes of virtual boundaries as the distance of a point 230 on the virtual boundary 170 and the angle $\theta_R$ vary. The virtual line 220 is an imaginary line extending from the vehicle 100, e.g., a reference point 150, to a target 200.

The computer 110 may be programmed to operate based on a control barrier function (as discussed below with respect to Expressions (2)-(4)) that determines a barrier distance h along a virtual line 220 extending from the vehicle 100, e.g., a reference point 150, to a target 200. The relative distance h is defined as a distance (or length) along the line 220 from a point 230 on the virtual boundary 170 at respective orientations of a virtual line 220 to the target 200. The point 230 is at an intersection of the virtual line 220 with the virtual boundary 170. A distance h is defined as a distance from the virtual boundary 170 of the vehicle 100 to a target 200. Additionally or alternatively, as discussed below, h may represent a relative motion between the vehicle 100 and a target 200 taking into account various physical parameters such as relative distance, relative acceleration, relative speed between the vehicle 100 and the target 200. When other physical parameters, such as speed or acceleration, are taken into account, a visualization of distance h and boundary 170 may need to include a third dimension z (not shown). Alternatively, level sets may be used to illustrate the boundary in the plane. A level-set is an embedding of a higher-dimensional geometric object into a lower-dimensional subspace by fixing one of the independent variables. Examples include visualizing horizontal cut-outs of 3D geometric objects. For example, dimensions of the boundary around the vehicle 100 may either increase or decrease in size depending on a sign of the relative velocity of the vehicle 100 and target 200. For example, if the relative velocity is negative (indicating the vehicle 100 is approaching the target 200), then the virtual boundary 170 would be enlarged. Alternatively, if the relative velocity is positive, the virtual boundary 170 may shrink in size. Lines $x_h$, $y_n$ illustrated in FIG. 2 are axes of a coordinate system defined with respect to the vehicle 100, i.e., a Cartesian coordinate system having an origin at the reference point 150. Parameters r, $\Gamma$, $v_H$, $v_T$, $\theta_R$, $\theta_T$, represent, respectively, (i) a distance between the target 200 and the virtual boundary reference point 150, (ii) a distance of the virtual boundary 170 from the point 230 and the reference point 150, (iii) a velocity vector of the vehicle 100, (iv) a velocity vector (i.e., a vector specifying a direction and magnitude of speed) of the target 200, (v) an angle between the virtual line 220 and reference line $x_h$, and (vi) an angle between the velocity vector $v_T$ of the target 200 and the reference line $x_n$. Expression 1 below thus illustrates a mathematical function for determining the relative distance h.

$$h(r, \theta_R, \theta_T, v_H, v_T) = r - \Gamma(\theta_R) \quad (1)$$

A Control Barrier Function, herein, is an expression, i.e., a mathematical relationship, such as Expressions (2)-(4), which define a constraint to be satisfied. A Control Barrier Function (CBF) is a barrier function where for every state $x(t) \in X$, there exists a control input $u(t) \in U$ such that (2) is true. Note that defining a control barrier is based on a mathematical model for a system, e.g., $\dot{x} = f(x) + g(x) u$ to specify a state of a system including the vehicle 100 and the target 200. Thus, Expression (1) defines the CBF, Expression (2) may be used to define a set of x that satisfy the CBF, and Expression (3) defines a dynamic constraint to be enforced via a control input u. With reference to Expression (2) below, the computer 110 may be programmed to operate the vehicle 100 such that the barrier function h(x) is greater than or equal 0 (zero), i.e., avoiding that a target 20 enters the virtual boundary 170. x(t) represents a location of the vehicle 100 at a time t. The time t is a time at which the vehicle 100 is operated using control barrier function to avoid the target 200 entering the virtual boundary 170 of the vehicle 100.

$$h(x(t)) \geq 0 \quad (2)$$

The computer 110 may determine the propulsion and/or braking override $\dot{u}$ by performing an optimization operation on a control barrier function (e.g., as shown in example Expressions (2), (3), or (4) including a relative distance function h and a derivative of the relative distance function $\dot{h}$. With reference to Expression (3), which specifics a constraint providing an improved approach to avoid a target 200 entering the virtual boundary 200, the computer 110 may be programmed to determine the derivative of the distance function based on a derivative of a distance of a virtual line 220 extending from the virtual boundary 170 to the one or more targets 200 and a derivative of the orientation of the virtual line 220 relative to a virtual reference line $x_H$. Expression (3) further depends on a control input u(t), e.g., actuation of steering and acceleration of the vehicle 100. Thus, control function u(t) or a range for the control function u(t) may be identified which satisfies the Expression (3). A function $\dot{h}((x(t), u(t))$ is a temporal derivative of function h based on location x(t) of the vehicle 100 and the control input u(t).

$$\dot{h}((x(t), u(t)) + \lambda h(x(t)) \geq 0 \quad (3)$$

In some examples, to compensate for uncertainty, a margin for the uncertainty may be built into the control barrier function, e.g., as shown in Expression (4). Uncertainty is a measure of potential inaccuracy, i.e., specifies a level of expected precision or accuracy, in data from sensors 130. For example, there may be uncertainty in determining the relative distance or relative motion h based on data received from the sensors 130. For example, an object detection sensor 130 determining a distance from a target 200 may have in the inaccuracy of 1 meter.

$$\dot{h}((x(t), u(t)) + \lambda h(x(t) - \varepsilon \geq 0 \quad (4)$$

Equations (5)-(6b), shows other examples of defining relative motion h and a derivative of relative motion $\dot{h}$. Function $\gamma$ is a spatial gradient with respect to a relative heading angle of the vehicle 100, as shown in Expression (6b).

$$h(r, \theta_R, \dot{r}) = r - \Gamma(\theta_R) \quad (5)$$

$$\dot{h}(r, \theta_R) = \dot{r} - \gamma(\theta_R) \dot{\theta}_R \quad (6a)$$

$$\gamma(\theta_R) := \frac{\partial}{\partial \theta_R} \Gamma(\theta_R) \quad (6b)$$

The computer 110 may be programmed to determine (i) an override of propulsion, (ii) a combination of overriding propulsion and steering, (ii) an override of steering only, (iii) an override of steering and an override of braking, or any other combination of overriding propulsion, steering, and braking. The computer 110 may be programmed to determine steering override $\bar{\delta}$ and acceleration override $\bar{u}$ using an optimization technique, e.g., Quadratic Programming. Quadratic programming (QP) is a type of non-linear programming for solving mathematical optimization problems involving quadratic functions; QP can be used to optimize (minimize or maximize) a multivariate quadratic function subject to linear constraints on the variables. For example, the computer 110 may be programmed to identify optimized minimum overrides $\bar{\delta}$, $\bar{u}$ for Expression (3) based on min operation (7). Operation (7) returns minimum values for overrides $\bar{\delta}$, $\bar{u}$ based on, e.g., Expression (3). Thus, based on solving the optimization problem expressed in Expression (7) subject to the constraint given in (3), only certain combinations of steering/braking will be satisfying Expression (3). Based on the result of optimization, then, a minimum "amount" of steering/braking is taken to actuate the vehicle 100 actuators 120. The computer 110 may be programmed to determine adjusted actuation commands based on the planned values and override values. For example, with reference to Equation (8), the computer 110 may be programmed to determine an adjusted steering actuation $\delta_{adj}$ based on the determined steering actuation $\delta_p$ (e.g., determined by a human operator or an autonomous vehicle control system) and the determined steering override $\bar{\delta}$. With reference to Equation (9), the computer 110 may be programmed to determine an adjusted acceleration actuation $u_{adj}$ based on the determined acceleration actuation $u_p$ (e.g., determined by human operator or autonomous vehicle control system) and the determined acceleration override $\bar{u}$.

$$\min[\bar{\delta} \ \bar{u}]H\begin{bmatrix}\bar{\delta}\\\bar{u}\end{bmatrix} \quad (7)$$

$$\delta_{adj}=\delta_p+\bar{\delta} \quad (8)$$

$$u_{adj}=u_p+\bar{u} \quad (9)$$

The technique disclosed herein can simultaneously be applied to more than one target 200. Expression (10) specifies a first barrier function $h_1$ for a first target 200 and Expression (11) specifies a second barrier function $h_2$ for a second target 200. The computer 110 may be programmed to identify overrides $\bar{\delta}, \bar{u}$ while simultaneously satisfying the Expressions (10)-(11).

$$\dot{h}_1((x(t),u(t))+\lambda h_1(x(t)\geq 0 \quad (10)$$

$$\dot{h}_2((x(t),u(t))+\lambda h_2(x(t)\geq 0 \quad (11)$$

Based on, e.g., physical characteristics of vehicle 100 actuators 120, road conditions, etc., maximum allowed acceleration, deceleration, and/or steering actuation limits may be specified. For example, a maximum braking deceleration may be determined based on braking actuator 120 characteristics, e.g., a friction coefficient of brake pads, a vehicle 100 weight, a vehicle 100 aerodynamic resistance, etc., and/or a road condition, e.g., a coefficient of friction, rain, snow, ice, etc. Equations (12)-(13) show examples of the relative motion function h that further includes maximum allowed deceleration. The operator "sgn" is a function returning 1 (one) for positive input, −1 (minus one) for negative input and 0 (zero) for a 0 (zero) input. A maximum acceleration is computed defined as d in the denominator of Expression (12). When vehicle 100 is heading straight toward the target 200, and can only use deceleration, the value of the function h will be negative if more deceleration is needed than the amount given by d. This is found via kinematic expressions for constant deceleration, i.e. if an initial relative velocity and distance from the target 200 are known, then a constant deceleration will result in a fixed amount of distance traveled. If the actual distance is less than the distance needed, then the vehicle 100 may hit the target 200. The function h is then positive if there is enough distance to stop assuming maximum deceleration. Note that there is no encoding of maximum steering. Additionally or alternatively, an additional constraint such as $|\delta_{adj}|\leq\delta_{max}$ may be added to Expressions (10)-(11).

$$h(r, \theta_R, \dot{r}) = r - \Gamma(\theta_R) + \text{sgn}(\dot{r})\frac{\dot{r}^2}{2d} \quad (12)$$

$$\dot{h}(r, \theta_R) = \dot{r} - \gamma(\theta_R)\dot{\theta}_R + \text{sgn}(\dot{r})\frac{\dot{r}}{d}\ddot{r} \quad (13)$$

FIG. 4 is a flowchart of an example process 400 for controlling vehicle 100 operation. The computer 110 may be programmed to execute blocks of the process 400.

The process 400 begins in a block 410, in which the computer 110 determines or receives a predetermined virtual boundary 170 of the vehicle 100. For example, as discussed with respect to FIG. 2, the computer 110 may be programmed to determine and store a function $\Gamma(\theta_R)$ that returns a distance from a reference point 150 of the virtual boundary 170 to a point on the virtual boundary 170 for each given angle specified location $\theta_R$. Alternatively, the computer 110 may store, and/or receive from a remote computer, a default virtual boundary 170 definitions Next, in a decision block 420, the computer 110 determines whether one or more targets 200, e.g., other vehicles, pedestrians, buildings, vegetation, etc., is or are detected. The computer 110 may be programmed to identify a target 200 based on data received from a vehicle 100 sensor 130, a remote computer, etc., according to any suitable means. If the computer 110 determines that one or more targets 200 are detected, then the process 400 proceeds to a decision block 430; otherwise the process 400 returns to the decision block 420.

In the decision block 430, the computer 110 determines whether an actuation input is received. The computer 110 may be programmed to an actuation input from a human operator, e.g., via HMI 140, and/or from an autonomous vehicle control system, e.g., a second program stored in the computer 110 memory, an FPGA communicating with the computer 110 via a vehicle 100 network, etc. For example, actuation inputs may include acceleration or deceleration actuation $u_p$ and/or steering actuation $\delta_p$. If the computer 110 determines that actuation input is received, then the process 400 proceeds to a decision block 440; otherwise the process 400 returns to the decision block 430.

In the decision block 440, the computer 110 determines whether a control barrier function, e.g., as specified in Expression (3), is satisfied. In another example, if more than one target 200 is identified, the computer 110 may be programmed to determine whether each of the respective barrier functions, e.g., as shown in Expressions (10)-(11) are satisfied. If the barrier function(s) associated with detected target(s) 200 are satisfied, then the process 400 proceeds to a block 450; otherwise the process 400 proceeds to a block 460.

In the block 450, the computer 110 applies the received actuation inputs of the block 430. Following the block 450, the process 400 ends, or alternatively returns to the block 410, although not shown in FIG. 1.

In the block 460, the computer 110 determines one or both of actuation overrides $\bar{\delta}, \bar{u}$. The computer 110 may be programmed to perform an optimization technique to identify propulsion or braking override $\bar{u}$, and/or steering override $\bar{\delta}$ based on a respective Expression (3). In another example, when multiple targets 200 are identified, the computer 110 may identify override actuation $\bar{\delta}, \bar{u}$ while satisfying multiple Expressions, e.g., Expressions (10)-(11).

Next, in a block 470, the computer 110 applies adjusted actuation commands $\delta_{adj}, u_{adj}$ to the vehicle 100 actuators 120. The computer 110 may be programmed, based on Equations (8)-(9), to determine the adjusted actuation commands $\delta_{adj}, u_{adj}$ based on the received actuation input $\delta_p, u_p$, and the determined overrides $\bar{\delta}, \bar{u}$. Following the block 470, the process 400 ends, or alternatively returns to the block 410, although not shown in FIG. 1.

Computing devices as discussed herein generally each includes commands executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system for detecting a road surface, comprising a processor and a memory, the memory storing instructions executable by the processor to:
   determine a virtual boundary for a vehicle body based on a shape of the vehicle body defined according to a projection of the vehicle body on a ground surface, wherein the instructions to determine the virtual boundary further include instructions to specify the virtual boundary by specifying a function that determines lengths of virtual lines from a reference point inside the shape of the vehicle body and a point on the shape at respective orientations of the virtual line relative to a reference line;
   identify one or more objects based on vehicle sensor data;
   based on the identified one or more objects, the determined virtual boundary, and an input to at least one of propulsion, steering, or braking, determine at least one of a braking override or a steering override;
   and based on the determination, perform at least one of adjusting a vehicle steering and a vehicle speed.

2. The system of claim 1, wherein the instructions to determine the at least one of the braking override or the steering override include instructions to perform an optimization operation on a control barrier function including a distance function and a derivative of the distance function, wherein the distance function is defined, at an orientation of a line extending from a reference point of the virtual boundary to the one or more objects, based on a length of the line from the one or more objects to an intersection with the virtual boundary.

3. The system of claim 2, wherein the instructions further include instructions to determine the derivative of the distance function based on a derivative of distance of a virtual line extending from the virtual boundary to the one or more objects and a derivative of the orientation of the virtual line relative to a virtual reference line.

4. The system of claim 1, wherein the instructions further include instructions to determine the braking override further based on a maximum specified deceleration.

5. The system of claim 1, wherein the instructions further include instructions to determine the steering override further based on a maximum specified steering.

6. The system of claim 1, wherein the input to at least one of propulsion, steering, or braking is received from at least one of a vehicle operator or an autonomous vehicle control system.

7. A method for detecting a road surface, comprising:
   determining a virtual boundary for a vehicle body based on a shape of the vehicle body defined according to a projection of the vehicle body on a ground surface, wherein determining the virtual boundary further includes specifying the virtual boundary by specifying a function that determines lengths of virtual lines from a reference point inside the shape of the vehicle body and a point on the shape at respective orientations of the virtual line relative to a reference line;
   identifying one or more objects based on vehicle sensor data;
   based on the identified one or more objects, the determined virtual boundary, and an input to at least one of propulsion, steering, or braking, determining at least one of a braking override or a steering override; and
   based on the determination, performing at least one of adjusting a vehicle steering and a vehicle speed.

8. The method of claim 7, wherein determining the at least one of the braking override or the steering override further includes performing an optimization operation on a control barrier function including a distance function and a derivative of the distance function, wherein the distance function is defined, at an orientation of a line extending from a reference point of the virtual boundary to the one or more objects, based on a length of the line from the one or more objects to an intersection with the virtual boundary.

9. The method of claim 8, further comprising determining the derivative of the distance function based on a derivative of distance of a virtual line extending from the virtual boundary to the one or more objects and a derivative of the orientation of the virtual line relative to a virtual reference line.

10. The method of claim 7, further comprising determining the braking override further based on a maximum specified deceleration.

11. The method of claim 7, further comprising determining the steering override further based on a maximum specified steering.

12. The method of claim 7, further comprising receiving the input to at least one of propulsion, steering, or braking from at least one of a vehicle operator or an autonomous vehicle control system.

13. The system of claim 1, wherein the projection is determined from features on the vehicle body that are at different respective heights from a ground surface.

14. The system of claim 1, wherein the instructions to determine the virtual boundary further include instructions to specify the virtual boundary by specifying points on the virtual boundary according to a specified distance from respective nearest points on the vehicle body.

15. The method of claim 7, wherein the projection is determined from features on the vehicle body that are at different respective heights from a ground surface.

16. The method of claim 7, determining the virtual boundary includes specifying the virtual boundary by specifying points on the virtual boundary according to a specified distance from respective nearest points on the vehicle body.

* * * * *